Feb. 3, 1942.        W. M. MANSFIELD        2,271,740
                      COUNTERBALANCE
              Filed Feb. 17, 1939          2 Sheets-Sheet 2
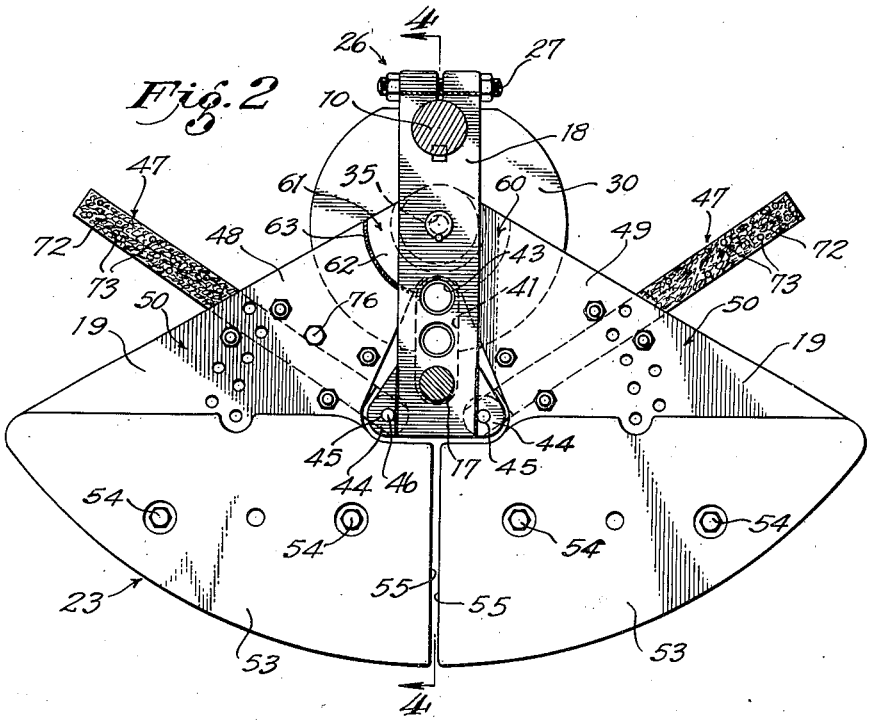
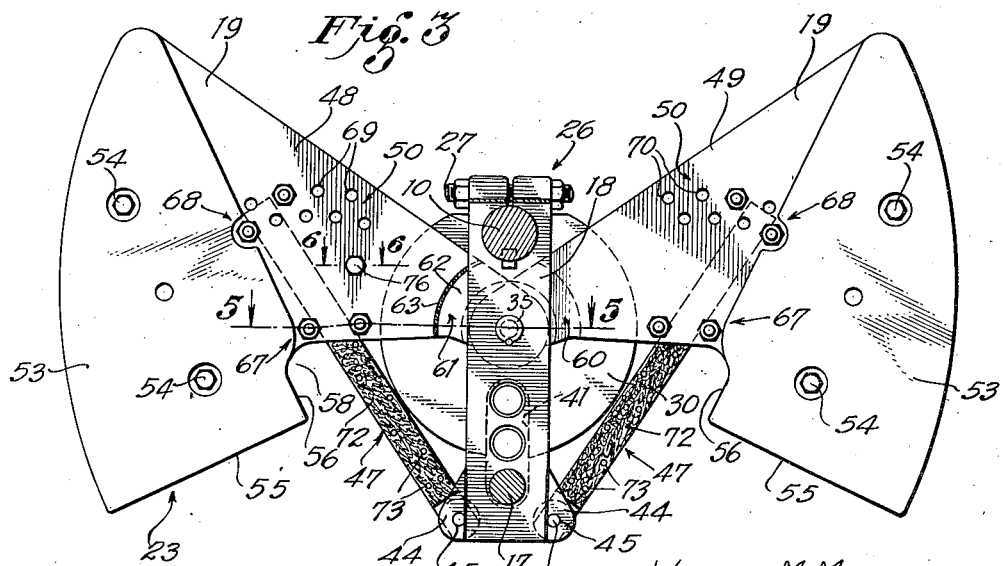
WARREN M. MANSFIELD,
INVENTOR.
BY 
ATTORNEY Patented Feb. 3, 1942

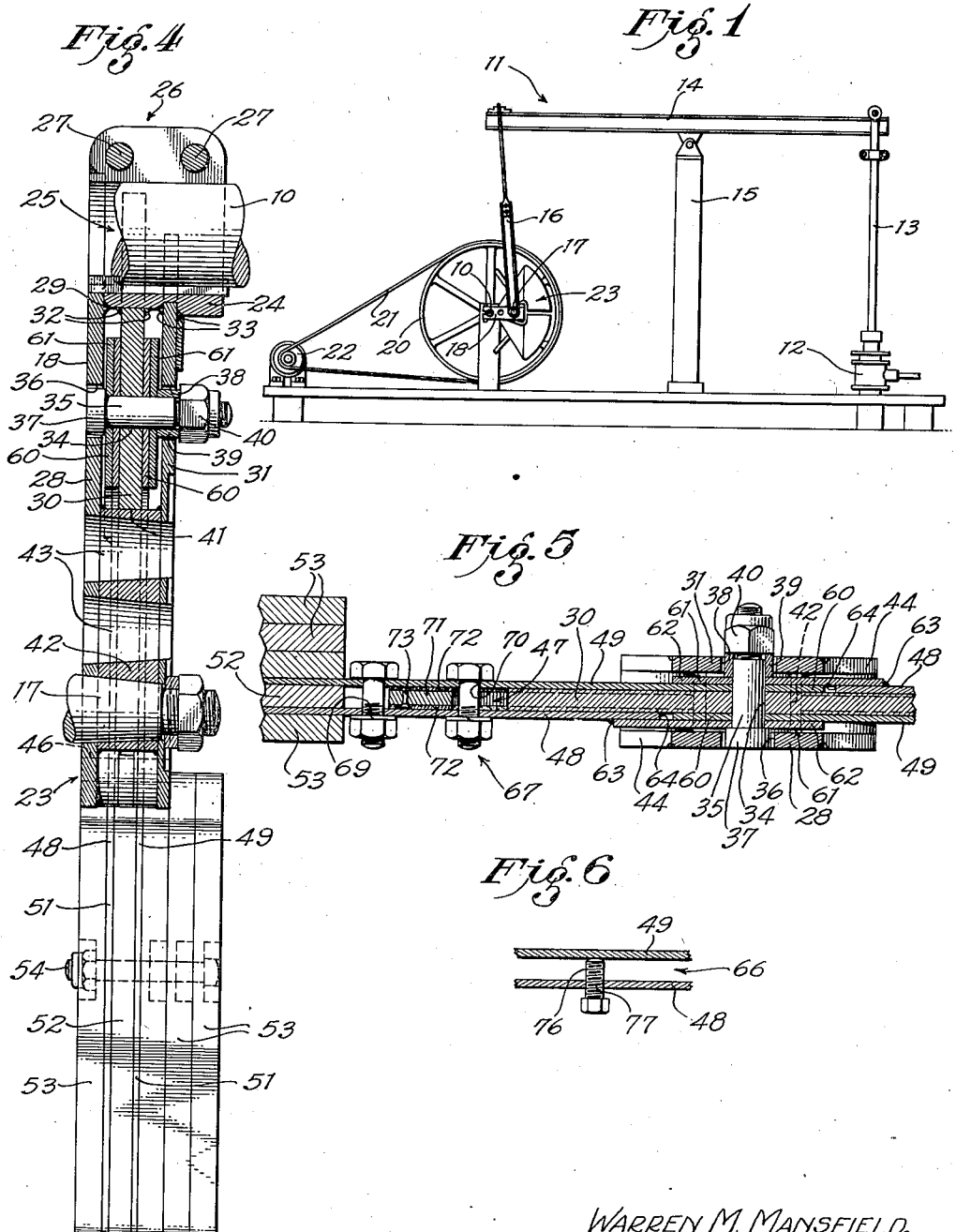

2,271,740

UNITED STATES PATENT OFFICE 2,271,740

COUNTERBALANCE

Warren M. Mansfield, Glendale, Calif., assignor to Emsco Derrick & Equipment Company, Los Angeles, Calif., a corporation of California Application February 17, 1939, Serial No. 256,985

16 Claims. (Cl. 74—591)

My invention relates to a counterbalance which may be used with pumping equipment of the type employed on oil wells, and relates in particular to a simple counterbalance which may be readily adjusted within a relatively wide range.

It is an object of the invention to provide a counterbalance of simple form which may be readily attached to a rotary member, such as a crank shaft, and which has adjustable weight means securable in different positions to selectively attain a counterbalancing effect with maximum and minimum limits.

It is a further object to provide an adjustable crank arm and counterbalance structure so formed that the center of mass of the counterbalance may be shifted from one side to the other of the radial plane defined by the crank shaft and the crank pin.

It is a further object of the invention to provide a device of the above character having a simple form of counterbalance member and simple but effective means for securely holding the counterbalance member in desired positions of adjustment.

A further object of the invention is to provide a counterbalance device having frictional engaging means for holding a counterbalance member in a desired position of adjustment relative to a crank arm.

A further object of the invention is to provide a counterbalance for a crank arm which may be readily built up from steel parts so as to provide a support for a crank pin and a support for a pivot on which the counterweights may be swung, there being means near the outer end of the crank arm to pivotally support bars or struts to hold the counterweights in desired positions of adjustment relative to the crank arm and to the center of rotation of the crank.

A further object of the invention is to provide a counterbalance having a support and a movably mounted counterweight, with a strut member to hold the counterweight in operative position, at least one of these cooperating parts having a face prepared for frictional engagement with the other of the parts whereby the same may be clamped together in desired positions of adjustment.

A further object of the invention is to provide a counterweight wherein the weight member has spaced walls to form a space to receive a bar or strut, and means for clamping the spaced walls against the bar or strut when the members are in desired cooperating positions.

Further objects and advantages of the invention will be brought out in the following part of the specification.

Referring to the drawings which are for illustrative purposes only.

Fig. 1 is an elevational view of a pumping device accompanied with a preferred form of my counterbalance.

Fig. 2 is an enlarged face view showing the counterbalance of Fig. 1 in suspended position relative to the crank shaft, and with the weight parts thereof adjusted to a position to give maximum counterbalance effect.

Fig. 3 is a view corresponding to Fig. 2 but showing the weights of the device in retracted position.

Fig. 4 is an enlarged cross-section taken on a plane indicated by the line 4—4 of Fig. 2.

Fig. 5 is an enlarged cross-section taken as indicated by the line 5—5 of Fig. 3.

Fig. 6 is an enlarged fragmentary cross-section taken as indicated by the line 6—6 of Fig. 3.

In Fig. 1 I show a general application of the invention in conjunction with a pumping device 11 placed at an oil well 12 for the reciprocation of a pumping string 13 such as a string of sucker rods. This pumping device includes a walking beam 14 pivotally supported on the upper end of a samson post 15. The front end of the walking beam 14 is connected to the sucker rod string 13 and the rear end thereof is connected through through a link 16 with a crank pin 17 supported by a crank arm 18 in eccentric relation to a crank shaft 10 which may be rotated through use of a wheel 20 driven through a belt 21 from a motor 22. My invention provides a counterbalance 23 associated with or including the crank arm 18, this counterbalance 23 being adjustable between maximum and a substantially zero counterbalance effect without the necessity of adding to or removing weight elements from the device. The maximum capacity of the counterbalance may be varied by changing the number of weight segments entering into the composition of the adjustable weight members of the device.

As best shown in Figs. 2 to 4 inclusive, the counterbalance 23 includes a support, preferably in the form of a crank arm 18 for adjustable weight members 19 which may be swung from the extended positions thereof, shown in Fig. 2, to retracted or lateral positions, as shown in Fig. 3. The crank arm is preferably of a type to be detachably secured to the shaft 10 and includes a collar or body 24 having an opening 25 to fit the shaft 10, and having clamping means 26 including bolts 27, to clamp the crank arm 18 on the shaft 10. The crank arm proper includes a front plate 28 welded at 29 to the collar 24, an intermediate plate 30 and a rear plate 31 in spaced relation to the front plate 28 and being respectively welded to the collar 24 as indicated at 32 and 33. Near the collar 24 the intermediate plate 30 has an opening 34 through which a pivot pin 35 passes, there being a larger opening 36 in the front plate 28 to receive the head 37 of the pin 35 and a similar larger opening 38 in the rear plate 31 to receive a spacer sleeve 39 disposed adjacent an external nut 40.

The front and rear plates 28 and 31 are rectangular, but the intermediate plate 30 is substantially circular around the axis of the pin 35, and into a notch 41 in the lower portion thereof a steel block 42 is set, this block being of a thickness as shown in Fig. 4 to extend from the inner face of plate 28 to the inner face of plate 31. The block is welded in place and openings 43 are drilled through the plate 28, the block 42, and the plate 31, these openings being adapted to receive the crank pin 17 in a plurality of positions radially spaced from the axis of the shaft 10. Ears 44 are welded to the lower portions of the front and rear plates 28 and 31 to provide openings 45 for pins 46 on which struts or arms 47 are swingable.

Each weight member 19 comprises a pair of plates 48 and 49, each of these plates having an inner triangular portion 50 and an outer segmental portion 51. The outer portions 51 of each pair of plates 48 and 49 are held in spaced relation by a filler block 52 and additional plates or blocks 53 are clamped against the outer portions 51 of the plates 48 and 49 by use of bolts 54. In Fig. 4, four of the plates 53 are shown in face-to-face relation. The maximum counterbalance effect of the weight members 19 may be changed by changing the number of plates 53 in the assemblies of such plates entering into the formation of the respective weight members. The inner edges 55 of the plates 48 and 49, and the inner edges of the plates 53, lie along a plane which passes through the pin 35 so that when the weight members 19 are brought into extended position, as shown in Fig. 2, the lower portions thereof will nearly meet below the end of the crank arm 18, each weight member 19 having a notch 56 in the inner edge thereof, as best shown in Figs. 2 and 3. The filler blocks 52 are essentially the same thickness as the intermediate plate 30, so that the inner faces of the plates 48 and 49 will lie in close contact with the external faces of the plate 30, and by their straddling relation to the plate 30 these plates 48 and 49 will be guided and will be prevented from swinging in a direction other than radially with respect to the shaft 10.

As best shown in Fig. 5, the upper extremities of the plates 48 and 49 are provided with suitable offsets so that the same may be placed in overlapping relation in the area surrounding the pivot pin 35.

I have shown each plate 49 as having an upper end portion 60 extending continuously across a face of the intermediate plate 30 and surrounding a portion of the pin 35, and I have shown each plate 48 with an offset upper end 61 so that it may overlie the upper end 60 of a plate 49. Such offsets 61 are preferably formed by welding a plate portion 62 and 63 in overlapping relation to the inner edge 64 of a plate 48, which inner edge 64 lies adjacent to the inner edge of a portion 60 of a plate 49. When the parts are assembled, the upper end portions 60 and 61 of the plates 48 and 49 extend into the spaces between the plates 28, 30, and 31, after which the pin 35 is placed, as best shown in Fig. 4. When the nut 40 is tightened down against the spacer sleeve 39, the head 37 and the spacer sleeve 39 clamp the assembly of plate portions 60 and 61 tightly against the intermediate plate 30, so that this intermediate plate serves to positively guide the weight members 19.

The struts 47 provide a simple means for holding the weight members 19 in adjusted position. They extend into the spaces 66 between the plates 48 and 49 and are rigidly clamped to the weight members by means of two sets of bolts 67 and 68 which pass through openings 69 and 70 in the plates 48 and 49. The bolts 67 remain in fixed position, but the bolts 68 are moved from one set of openings 70 to another as the struts 47 swing from the position in which they are shown in Fig. 2 to the position thereof in Fig. 3, such swinging movement being determined by and in accordance with the change in position of the weight members 19. The function of the bolts 67 is to serve as guide means for determining the positions of the struts 47. The number of openings 70 is such that the bolts 68 may be removed from one set of openings 70 to another in accordance with the change in position of the struts 47.

These bolts 67 and 68 force the plates 48 and 49 into locking engagement with the struts 47. Although I comprehend that the cooperating faces of the struts and the plates 48 and 49 may be suitably grooved or deformed so as to provide an interengagement between these parts, I prefer merely to use frictional engagement of the plates 48 and 49 with the struts 47 to securely hold the weight members 19 in place. As shown in Fig. 5, each strut 47 includes a metal bar 71 with facings 72 of frictional material secured to the faces thereof by means such as rivets 73. These friction facings 72 may be of a material such as employed for brake bands, and the outer surfaces thereof are presented to the inner faces of the plates 48 and 49 to make frictional engagement therewith which will positively prevent relative movement of the struts 47 and the weight members 19 when the bolts 67 and 68 are securely tightened.

As shown in Fig. 6, I provide a means for spreading the plates 48 and 49 when it is desired to adjust the weight members 19 to different positions. Such spreading means are each shown in the form of a jack screw 76 which threads through an opening 77 of one plate 48 or 49 into engagement with the inner face of the other plate 49 or 48. When these jack screws 76 are tightened they will spread the pairs of plates 48 and 49 so that the struts may slide relatively freely in the spaces 66. These screws 76 are released prior to the tightening of the clamping screws 67 and 68.

The weight members may be adjusted independently. For example, one weight member may be secured in the extended position in which the weight members are shown in Fig. 2 while the other of the weight members may be swung back toward or into a lateral position such as that in which the weight members are shown in Fig. 3. This manner of adjustment of the positions of the weight members will shift the center of mass of the counterbalance to one side of the center line of the crank arm 18, thereby making it possible to change the action of the counterbalance relative to the movement of the link 16 which is attached to the crank pin 17. The plates 53 are of such form that they may be transferred from one weight member 19 to the other so that the shifting of the center of mass of the counterweight may be effected either by independent swinging of the weight members 19, shifting of the plates 53, addition or subtraction of the plates 53, or a combination of all of the foregoing.

Herein I have shown a simple and practical embodiment of my invention, but it is to be understood that parts thereof may be replaced by other parts of equivalent function therefor. I do not consider that the invention is limited to the details of construction but is of the scope set forth in the appended claims.

I claim as my invention:

1. In a counterbalance of the character described, the combination of: a shaft; a crank arm extending from said shaft; a crank pin connected so as to rotate with said shaft and said crank arm; weight means; pivotal connecting means holding said weight means so that it may swing relative to said crank arm; and adjustable means in swingable relation to said crank arm and said weight means to hold said weight means in desired positions of adjustment relative to said crank arm, said adjustable means comprising a strut in adjustable relation to said crank arm and said weight means, said strut having a facing of friction material and said weight means having a facing of friction material and said weight means having means for cooperative holding engagement with said facing.

2. In a counterbalance of the character described, the combination of: a shaft, a crank arm extending from said shaft, said crank arm providing a wall; weight means comprising a pair of plates in spaced relation so as to straddle said wall of said crank arm; means for supporting said weight means so that it may have adjusting movement on said wall; a friction member extending from said crank arm into the space between said plates; and means for clamping said plates against said friction member so as to lock said weight means in adjusted position relative to said crank arm.

3. In a counterbalance of the character described, the combination of: a shaft; a crank arm extending from said shaft, said crank arm providing a wall; weight means comprising a pair of plates in spaced relation so as to straddle said wall of said crank arm; means for supporting said weight means so that it may have adjusting movement on said wall; a strut swingably mounted on said crank arm and extending into the space between said plates; and means for clamping said plates against the opposite faces of said strut so as to lock said weight means in adjusted position relative to said crank arm.

4. In a counterbalance of the character described, the combination of: a crank arm to extend from a shaft, said crank arm having an intermediate palte and front and rear plates defining spaces on opposite sides of said intermediate plate, there being aligned openings through said plates; weight means having a pair of spaced plates to extend into said spaces and lying on opposite sides of said intermediate plate; pivot means extending through said openings and engaging said spaced plates so that said spaced plates will swing thereon; and means connecting a point on said weight means with a point on said crank arm to hold said weight means in an adjusted position relative to said crank arm.

5. In a counterbalance of the character described, the combination of: a crank arm to extend from a shaft, said crank arm having an intermediate plate and front and rear plates defining spaces on opposite sides of said intermediate plate, there being aligned openings through said plates; weight means having a pair of spaced plates to extend into said spaces and lying on opposite sides of said intermediate plate; pivot means extending through said openings and engaging said spaced plates so that said spaced plates will swing thereon; a holding member extending from said crank arm and between said spaced plates of said weight means; and means to clamp said spaced plates against said holding member to lock said weight means in an adjusted position relative to said crank arm.

6. In a counterbalance of the character described, the combination of: a crank arm to extend from a shaft, said crank arm having an intermediate plate and front and rear plates defining spaces on opposite sides of said intermediate plate, there being aligned openings through said plates; weight means having a pair of spaced plates to extend into said spaces and lying on opposite sides of said intermediate plate; pivot means extending through said openings and engaging said spaced plates so that said spaced plates will swing thereon; a bar extending from said crank arm and between said spaced plates of said weight means; and means to clamp said spaced plates against said bar member to lock said weight means in an adjusted position relative to said crank arm.

7. In a counterbalance of the character described, the combination of: a crank arm to extend from a shaft, said crank arm having an intermediate plate and front and rear plates defining spaces on opposite sides of said intermediate plate, there being aligned openings through said plates; weight means having a pair of spaced plates to extend into said spaces and lying on opposite sides of said intermediate plate; pivot means extending through said openings and engaging said spaced plates so that said spaced plates will swing thereon; a bar extending from said crank arm and between said spaced plates of said weight means, said bar having friction material on at least one face thereof; and means to clamp said spaced plates against said bar member to lock said weight means in an adjusted position relative to said crank arm.

8. In a counterbalance of the character described, the combination of: a crank arm to extend from a shaft, said crank arm having an intermediate plate and front and rear plates defining spaces on opposite sides of said intermediate plate, there being aligned openings through said plates; weight means having a pair of spaced plates to extend into said spaces and lying on opposite sides of said intermediate plate; pivot means extending through said openings and engaging said spaced plates so that said spaced plates will swing thereon, there being means to hold said spaced plates in close relation to said intermediate plate so that said intermediate plate will serve as a guide for said weight means; and means connecting a point on said weight means in an adjusted position relative to said crank arm.

9. In a counterbalance of the character described, the combination of: a crank arm to extend from a shaft, said crank arm having an intermediate plate and front and rear plates defining spaces on opposite sides of said intermediate plate, there being aligned openings through said plates; weight means having a pair of spaced plates to extend into said spaces and lying on opposite sides of said intermediate plate; pivot means extending through said openings and engaging said spaced plates so that said spaced plates will swing thereon, there being means to hold said spaced plates in close relation to said intermediate plate so that said intermediate plate will serve as a guide for said weight means; a holding member extending from said crank arm and between said spaced plates of said weight means; and means to clamp said spaced plates against said holding member to lock said weight means in an adjusted position relative to said crank arm.

10. In a counterbalance of the character described, the combination of: a crank arm to extend from a shaft, said crank arm having an intermediate plate and front and rear plates defining spaces on opposite sides of said intermediate plate, there being aligned openings through said plates; weight means having a pair of spaced plates to extend into said spaces and lying on opposite sides of said intermediate plate; pivot means extending through said openings and engaging said spaced plates so that said spaced plates will swing thereon, there being means to hold said spaced plates in close relation to said intermediate plate so that said intermediate plate will serve as a guide for said weight means; a bar extending from said crank arm and between said spaced plates of said weight means, said bar having friction material on at least one face thereof; and means to clamp said spaced plates against said bar member to lock said weight means in an adjusted position relative to said crank arm.

11. In a counterbalance of the character described, the combination of: a shaft; a crank arm extending from said shaft; weight means comprising a pair of plates in spaced relation; means for supporting said weight means so that it may have adjusting movement on said crank arm; an adjusting member extending from said crank arm into the space between said plates; means for clamping said plates against said adjusting member to hold said weight means in adjusted position; and means to spread said spaced plates when it is desired to produce relative movement of said weight means and said adjusting member to change the position of said weight means relative to said crank arm.

12. In a counterbalance of the character described, the combination of: a shaft; an arm extending radially from said shaft; a crank pin connected to said arm so as to rotate with said shaft and said arm; pivotal connecting means disposed on said arm, between said shaft and said crank pin, on a radial line passing through said shaft and said crank pin; weight means swingably connected to said arm by said pivotal connecting means so as to swing relative to said arm; and frictional means for holding said weight means in selected positions of adjustment relative to said arm.

13. In a counterbalance of the character described, the combination of: a shaft; an arm extending radially from said shaft; a crank pin connected to said arm so as to rotate with said shaft and said arm; weight means; pivotal connecting means holding said weight means so that it may swing relative to said arm; strut means swingably connected to said crank arm and extending to said weight means; and frictional means forming engagement between said strut means and said weight means to hold said weight means in selected positions of adjustment relative to said arm.

14. In a counterbalance of the character described, the combination of: a shaft; an arm extending radially from said shaft; a crank pin connected to said arm so as to rotate therewith; weight means; pivotal connecting means holding said weight means so that it may swing relative to said arm; and adjustable means connecting said arm and said weight means to hold said weight means in desired positions of adjustment relative to said arm, said adjustable means comprising a strut extending from said arm to said weight means and being movable relative thereto during adjustment, joinder means connecting said strut to said arm and joinder means connecting said strut to said weight means, one of said joinder means comprising frictionally engaging elements and means for holding the same in frictional engagement whereby to accomplish the effect of joinder.

15. In a counterbalance of the character described, the combination of: a shaft; an arm extending from said shaft, said arm providing a wall projecting radially from said shaft; weight means disposed adjacent an edge of said wall and comprising a pair of plates in spaced relation so as to straddle said wall of said arm; means forming a pivotal connection of said plates to said wall for supporting said weight means so that they may have adjusting movement on said wall; and means for locking said weight means in adjusted position on said arm.

16. In a counterbalance of the character described, for use with a shaft, the combination of: an arm element to extend radially from said shaft, said element comprising a crank pin disposed in a position spaced from said shaft, pivot means on said arm element between said shaft and said crank pin and on a line extending through said shaft and said crank pin, and a wall radiating from said pivot means in a plane substantially perpendicular to the axis of said shaft; a pair of weight means disposed on opposite sides of said wall parallel to said plane, and being movable along the edges of said wall, each of said weight means having a pair of spaced plates extending therefrom across said wall so as to straddle the same and being connected to said pivot means whereby said weight means may be swung through different positions of adjustment parallel to said plane and around said pivot means; and means to connect said weight means to said arm element in selected positions of adjustment whereby different counterbalancing effects may be obtained from said weight means.

WARREN M. MANSFIELD.

CERTIFICATE OF CORRECTION.

Patent No. 2,271,740.   February 3, 1942.

WARREN M. MANSFIELD.

It is hereby certified that error appears in the printed specification of the above numbered patent requiring correction as follows: Page 3, first column, lines 31 and 32, claim 1, strike out "and said weight means having a facing of friction material"; and line 64, for "palte" read --plate--; and that the said Letters Patent should be read with this correction therein that the same may conform to the record of the case in the Patent Office.

Signed and sealed this 31st day of March, A. D. 1942.

(Seal)
Henry Van Arsdale,
Acting Commissioner of Patents.